United States Patent [19]

Vivant

[11] Patent Number: 4,738,898
[45] Date of Patent: Apr. 19, 1988

[54] MICROENCAPSULATION BY INTERFACIAL POLYADDITION

[75] Inventor: Gilbert Vivant, Lyons, France

[73] Assignee: Rhone-Poulenc Specialites Chimiques, Courbevoie, France

[21] Appl. No.: 940,901

[22] Filed: Dec. 10, 1986

[30] Foreign Application Priority Data

Dec. 10, 1985 [FR] France .................. 85 18453

[51] Int. Cl.$^4$ .............................. B01J 13/02
[52] U.S. Cl. ..................... 428/402.21; 71/DIG. 1; 106/21; 264/4.7; 424/408; 424/455; 424/497; 428/914; 503/215
[58] Field of Search ............... 264/4.7; 428/402.21; 346/215

[56] References Cited

U.S. PATENT DOCUMENTS 4,428,978  1/1984  Jabs et al. .................. 264/4.7 X

FOREIGN PATENT DOCUMENTS 0040770  12/1981  European Pat. Off. ............ 264/4.7
2498474   7/1982  France .
2105292   3/1983  United Kingdom ............... 264/4.7

Primary Examiner—Richard D. Lovering
Attorney, Agent, or Firm—Burns, Doane, Swecker & Mathis

[57] ABSTRACT

A variety of materials, e.g., colorants, agricultural chemicals, pharmaceuticals, etc., are conveniently microencapsulated within polyurea skin membranes by interfacial polyaddition, by emulsifying a polyisocyanato hydrophobic liquid in an essentially aqueous medium, said polyisocyanato hydrophobic liquid comprising dissolved material to be microencapsulated, an aliphatic diisocyanate (i) and an isocyanurate ring trimer (ii) of an aliphatic diisocyanate, the ratio by weight of said diisocyanate (i) to said trimer (ii) ranging from 0.05/1 to 0.70/1, and then interfacially reacting a polyamine therewith. The resulting suspension of microcapsules is well adapted, e.g., for the production of carbonless papers.

19 Claims, No Drawings

MICROENCAPSULATION BY INTERFACIAL POLYADDITION

BACKGROUND OF THE INVENTION

1. Field of the Invention

The present invention relates to the microencapsulation of a variety of materials by interfacial polyaddition, and, more especially, to the preparation of microcapsules whose wall members, or outer skins, comprise a polyurea.

2. Description of the Prior Art

U.S. Pat. No. 3,577,515 describes the encapsulation of various materials by interfacial condensation of additional organic intermediates capable of forming polyamides, polysulfonamides, polyesters, polycarbonates, polyurethanes or polyureas. These additional organic intermediates are present in substantially immiscible separate liquids, such as, in particular, water and a water-immiscible organic solvent. Thus, the '515 patent exemplifies the preparation of capsules having polyurea skin membranes by interfacial condensation of diisocyanates or polyisocyanates with a diamine and/or a triamine.

The use of many diisocyanates or polyisocyanates has been described in later patents. Thus, 1,6-diisocyanatohexane is mentioned in particular. The use of 1,6-diisocyanatohexane trimers has also been recommended, the trimer either containing a biuret group, or an isocyanurate ring. For example, published European patent application No. 40,770 describes a process for the preparation of aqueous suspensions of microcapsules by interfacial polyaddition of an aliphatic polyisocyanate containing an isocyanurate group with a compound containing active hydrogen, the pH being adjusted, upon completion of the polyaddition, to a value equal to or lower than 7.

Published French patent application No. 2,498,474 describes a process for the preparation of microcapsules by emulsifying, in a hydrophilic liquid, a hydrophobic liquid containing an aromatic polyisocyanate and an aliphatic isocyanate, such as the 1,6-diisocyanatohexane trimer containing a biuret group or the 1,6-diisocyanatohexane trimer containing an isocyanurate ring. The use of an aromatic polyisocyanate, however, presents the disadvantage of frequently producing discolorations which are undesirable, especially for papermaking applications.

SUMMARY OF THE INVENTION

Accordingly, a major object of the present invention is the provision of an improved process for microencapsulation by interfacial polyaddition, comprising emulsifying, in an essentially aqueous liquid, a hydrophobic liquid containing a polyisocyanate and, if desired, a dissolved organic material, and then forming the walls of the microcapsules by the addition of a polyamine thereto, and characteristically wherein the polyisocyanate comprises:

(i) an aliphatic diisocyanate, and
(ii) the isocyanurate ring trimer of an aliphatic diisocyanate, in which the weight ratio of aliphatic diisocyanate to trimer ranges from 0.05/1 to 0.70/1.

DETAILED DESCRIPTION OF THE PREFERRED EMBODIMENTS OF THE INVENTION

More particularly according to the present invention, the isocyanurate ring trimer (ii) is advantageously the trimer of the aliphatic diisocyanate (i), or the trimer of a different aliphatic diisocyanate.

Exemplary of the aliphatic diisocyanate, representative are 1,6-diisocyanatohexane, 1,5-diisocyanato-2-methylpentane, 1,5-diisocyanato-3-methylpentane, 1,4-diisocyanato-2,3-dimethylbutane, 2-ethyl-1,4-diisocyanatobutane, 1,5-diisocyanatopentane, 1,4-diisocyanatobutane, 1,3-diisocyanatopropane, 1,10-diisocyanatodecane, 1,2-diisocyanatocyclohexane, 1,4-diisocyanatocyclohexane, 1,2-bis(isocyanatomethyl)cyclobutane, bis(4-isocyanatocyclohexyl)methane, or 3,3,5-trimethyl-5-isocyanatomethyl-1-isocyanatocyclohexane.

The isocyanurate ring trimers of these aliphatic diisocyanates are prepared in known manner. For example, they may be prepared by heating same in the presence of a catalyst such as a tertiary amine, a phosphine, or an alkali or alkaline earth metal oxide, hydroxide or carboxylate. These catalysts are described, e.g., in *Journal of Cellular Plastics*, pages 85 to 90 (January, 1965) or in *Macromolecular Chemistry*, (5/1), pages 103 to 109 (1970).

French patent application No. 81/02,192 (published under No. 2,499,085) describes a process for the preparation of such compounds containing an isocyanurate group by cyclotrimerization of aliphatic isocyanates, catalyzed by a substituted disilazane.

French patent application No. 81/02,192 (published under number 2,499,085) describes a process for the preparation of such compounds containing an isocyanurate group by cyclotrimerization of aliphatic isocyanates, catalyzed by a substituted disilazane.

French patent application No. 81/23,135 (published under number 2,517,674) describes a process which is identical thereto, but catalyzed by a compound containing an aminosilyl group.

In a preferred embodiment of the invention, the weight ratio of aliphatic diisocyanate to trimer ranges from 0.10/1 to 0.45/1.

Among the aliphatic diisocyanates useful according hereto, more preferred is 1,6-diisocyanatohexane (HDI). 1,6-Diisocyanatohexane is preferably used with its trimer, 1,3,5-tris(6-isocyanatohexyl) isocyanurate.

The polyamine which is reacted with the compounds containing isocyanate groups to form the walls of the microcapsules is selected from those which contain at least two primary or secondary amine groups and which can be dissolved or dispersed in water.

Diamines such as 1,2-ethylenediamine, 1,3-diaminopropane, 1,4-diaminobutane, 1,6-diaminohexane, hydrazine, 1,4-diaminocyclohexane and 1,3-diamino-1-methylpropane are exemplary.

Diethylenetriamine, triethylenetetramine and bis(2-methylaminoethyl)methylamine are also representative.

It is obviously intended to use mixtures of polyamines, for example, a diamine and a tri- or tetraamine.

The hydrophobic liquid in which the compound containing isocyanate functions and, if desired, an organic material to be encapsulated are present may be any liquid which is essentially water-immiscible and capable of dissolving the above compounds.

The hydrophobic liquid may also be the organic material to be encapsulated, when the latter is a liquid and when it is used for applications requiring a high concentration of active substance.

For example, an aliphatic hydrocarbon, a chlorinated aliphatic hydrocarbon, an alicyclic hydrocarbon, a chlorinated alicyclic hydrocarbon, an aromatic hydrocarbon or a chlorinated aromatic hydrocarbon may thus be used.

Exemplary of the hydrophobic liquid, representative are cyclohexane, tetrachloroethylene, carbon tetrachloride, the xylenes, toluene, chlorobenzene, at least partially hydrogenated terphenyl, an alkylbiphenyl, and an alkylnaphthalene.

Alkylbiphenyls, at least partially hydrogenated terphenyl and alkylnaphthalenes are especially suitable for the encapsulation of dyes for carbonless paper applications.

The essentially aqueous liquid used in the process of the invention is typically water, and preferably an aqueous solution of a surfactant or a hydrophilic protective colloid.

Representative of suitable protective colloids, exemplary are polyacrylates, methyl celluloses, carboxymethyl celluloses, polyvinyl alcohol, partially esterified or etherified if desired, polyacrylamide, or synthetic polymers containing an anhydride or carboxylic acid function, such as ethylene/maleic anhydride copolymers. It may be necessary, for example in the case of aqueous solutions of a cellulosic compound, to add a small amount of an alkali metal hydroxide, such as sodium hydroxide, to aid in the dissolution thereof; cellulosic compounds of this type may also be used directly in the form of their salts, for example, their sodium salts.

As the surface-active agent, exemplary are those noted in the *Encyclopedia of Chemical Technology*, volume 8, pages 912 to 915, and having a hydrophile/lipophile balance value (HLB system) equal to or greater than 10.

Aqueous solutions containing from 0.1 to 5% by weight of surfactant or of a protective colloid as defined above are typically employed.

The material present in the hydrophobic liquid desired to be encapsulated may be any one of a very wide variety.

It is envisaged, for example, to encapsulate plant protection agents such as herbicides, fungicides or insecticides, which makes them less hazardous to handle.

It is also intended to encapsulate pharmaceutical products, food products, flavors, perfumes, colorants, paints or catalysts.

One of the preferred embodiments of the invention is in the microencapsulation of colorants, for the production of pressure-sensitive carbonless paper. The process of the invention results in microcapsules having leakproof wall members which are suitable for such application; this makes it possible to produce multicopy papers which do not release any dye during their storage or their handling.

In addition, the process of the invention enables preparation of suspensions of microcapsules having sufficient fluidity to permit uniform and fine coating onto paper.

Using this process, it is possible to prepare suspensions of microcapsules of relatively high concentrations, and this is of interest from the standpoint of the paper industry, since water has then to be removed.

In general, the concentration of microcapsules for an application of this type is equal to or greater than 25% by weight and preferably equal to or greater than 30% by weight.

Triphenylmethane derivatives, diphenylmethane derivatives, fluorane derivatives, thiazine derivatives and spiro derivatives are useful, in particular, as colorants.

Among the triphenylmethane derivatives, representative are, for example, 3,3-bis(paradimethylaminophenyl)-6-dimethylaminophthalide, 3,3-bis(paradimethylaminophenyl)phthalide and 3-(paradimethylaminophenyl)-3-(1,2-dimethyl-3-indolyl)phthalide.

Among the diphenylmethane derivatives, representative are, for example, 4,4′-bis(aminodimethyl)benzhydryl benzyl ether, an N-halophenylleucoauramine and N-(2,4,5-trichlorophenyl)leucoauramine.

Among the fluorane derivatives, representative are, for example, 3-chloro-7-diethylaminofluorane, 3-chloro-7-diethylamino-2-methylfluorane and 6-(N-ethyl-paratolylamino)-3-methyl-2-phenylaminofluorane.

Among the thiazine derivatives, representative are, for example, benzoylleucomethylene blue and paranitrobenzylleucomethylene blue.

Among the spiro derivatives, representative are, for example, 3-methylspirodinaphthopyran, 3-ethylspirodinaphthopyran, 3-propylspirodinaphthopyran and 3-propylspirodibenzopyran.

In practice, the subject process may be carried out in the following manner.

An aqueous phase is prepared, constituted by water, to which a surfactant or a protective colloid such as those mentioned above has been added, if desired. This phase can be agitated at several thousand revolutions per minute, with the aid of a turbine agitator, for a few seconds to a few minutes, but this is not essential. The hydrophobic phase is then added, including a solvent, dissolved in which is the mixture of aliphatic diisocyanate and its trimer containing an isocyanurate group and, if appropriate, the material to be encapsulated. As above indicated, the hydrophobic phase may also include the organic product to be encapsulated, when it is liquid, and the mixture of aliphatic diisocyanate and its isocyanurate ring trimer. After a period of rapid agitation, lasting from a few seconds to a few minutes, a stable emulsion is produced. The rate of agitation is regulated such that droplets of hydrophobic liquid in the aqueous phase are produced, having the desired dimensions.

The droplet size is a function of the choice of the protective colloid and of the rate of agitation, the latter being selected proportionately higher, the smaller the desired mean droplet diameters.

In general, the rate of agitation during the emulsifying stage is from 5000 to 10,000 revolutions per minute. The emulsifying stage is usually carried out at a temperature of 15° to 30.C.

Typically, when the emulsifying stage is completed, turbine agitation is discontinued and the emulsion is stirred with the aid of a common stirrer, for example, of the frame stirrer type, at a rate on the order of 200 to 1000 revolutions per minute.

An aqueous polyamine solution is then added. The amount of added polyamine is usually in excess relative to the stoichiometric amount necessary to convert the free isocyanate groups into urea groups. In most cases, from 101% to 150% of amine groups are added in relation to the free isocyanate groups, and preferably from 105% to 125%.

Upon completion of the emulsifying stage, the resulting emulsion may also be transferred into another reactor and the polyaddition stage described earlier can then be carried out.

The polyaddition reaction is permitted to proceed, typically at a temperature of 15° C. to approximately 30° C., for a period ranging from a few minutes to two hours. Then, in most cases, the temperature of the emulsion is raised to approximately 50° C. to 80° C. and the reaction is continued at this temperature for several hours, for example, for 2 to 10 hours.

In this manner, the process of the invention results in homogeneous and fluid suspensions typically containing, depending upon the charges introduced, from 20% to 60% by weight of microcapsules having a mean diameter of 2 to 100 microns.

For the particular application of the subject process for the production of carbonless paper, microcapsules having a mean diameter of 3 to 20 microns are prepared.

In order to further illustrate the present invention and the advantages thereof, the following specific examples are given, it being understood that same are intended only as illustrative and in nowise limitative.

EXAMPLE 1

A 1.5-liter Pyrex glass reactor fitted with a jacket permitting a heating or cooling liquid to be circulated therein, a lid, a condenser, a Polytron turbine agitator and a Teflon-coated stainless steel frame stirrer, was charged with a solution (a):
  (i) water: 403 g;
  (ii) carboxymethyl cellulose, sodium salt: 4 g.

This was stirred with the aid of the turbine agitator at 7800 revolutions/minute for 30 seconds at ambient temperature.

While the agitation was continued for 60 seconds, the following solution (c) was added:
  (i) dye solution:
    (a) partially hydrogenated terphenyl, trademark Solgyl TH 40: 206.6 g;
    (b) blue dye, S4G Pergascript: 10.9 g;
  (ii) 1,6-diisocyanatohexane: 9.13 g (5.43 $10^{-2}$ mole);
  (iii) 1,3,5-tris(6-isocyanatohexyl) isocyanurate: 36.54 g (7.2 $10^{-2}$ mole);
  (iv) hexadecane: 4.3 cm$^3$.

The weight ratio of 1,6-diisocyanatohexane to its trimer was 0.25/1.

A stable emulsion consisting of droplets of organic phase in the aqueous phase was obtained.

The frame stirrer was then activated at 300 revolutions/minute; the turbine agitator was stopped and the following solution (b) was added:
  (i) ethylenediamine: 11.74 g (19.56 $10^{-2}$ moles);
  (ii) water: 5.8 g.

The ethylenediamine charged represented, as amine groups, 120% of the isocyanate groups of 1,6-diisocyanatohexane and of its trimer, which were employed.

Stirring was continued for 30 minutes at ambient temperature (approximately 25° C.) and then the temperature was raised to 60° C. by circulating thermostated water through the reactor jacket.

This temperature was maintained for three hours.

In this manner, a homogeneous and fluid milky suspension was obtained, which contained 39.8% of microcapsules having a diameter of 5 microns to 12 microns.

This suspension was coated onto the face surface of a receiver paper which was coated with an acid resin used as a developer (coating fraction: CF). Coating with the microcapsule suspension was carried out with the aid of a doctor blade whose height was adjusted to 20–30 microns relative to the paper. Paper treated in this manner was placed for one hour, in the absence of light, in an oven at 100° C.: no appearance of discoloration; smooth appearance of the coated face.

The coated paper was then exposed to daylight until a slight blue discoloration appeared: this appeared after 72 hours.

EXAMPLE 2

The procedure of Example 1 was repeated under the same conditions, but using the following charges:

Solution (a)

(i) water: 403 g;
  (ii) carboxymethyl cellulose, sodium salt: 4 g.

Solution (c)

(i) dye solution:
    (a) partially hydrogenated terphenyl: 206.6 g;
    (b) blue dye, S4G Pergascript: 10.9 g;
  (ii) 1,6-diisocyanatohexane (HDI): 4.6 g;
  (iii) 1,3,5-tris(6-isocyanatohexyl) isocyanurate: 41.1 g;
  (iv) hexadecane: 4.3 cm$^3$.
Weight ratio HDI/trimer=0.11/1.

Solution (b)

(i) ethylenediamine: 10.73 g;
  (ii) water: 4.6 g.

A homogeneous and fluid milky suspension was obtained which contained approximately 40% of microcapsules having a diameter of 5 to 12 microns.

This suspension was coated onto the CF face surface of a receiver paper. Coating with the suspension of microcapsules was carried out as in Example 1. Paper treated in this manner was placed, in the absence of light, for one hour in an oven at 100° C.: no appearance of discoloration; smooth appearance of the coated face.

The coated paper was then exposed to daylight until a slight blue discoloration appeared: this appeared after 24 hours.

EXAMPLE 3

The procedure of Example 1 was repeated under the same conditions, but using the following charges:

Solution (a)

(i) water: 403 g;
  (ii) carboxymethyl cellulose, sodium salt: 4 g.

Solution (c)

(i) dye solution:
    (a) partially hydrogenated terphenyl: 206.6 g;
    (b) blue dye, S4G Pergascript: 10.9 g;
  (ii) 1,6-diisocyanatohexane (HDI): 13.7 g;
  (iii) 1,3,5-tris(6-isocyanatohexyl) isocyanurate: 32 g;
  (iv) hexadecane: 4.3 cm$^3$.
Weight ratio HDI/trimer=0.43/1.

Solution (b)

(i) ethylenediamine: 12.9 g;
  (ii) water: 7.0 g.

A slightly granular and fairly viscous milky suspension was obtained, which contained approximately 40% of microcapsules.

This suspension was coated onto the CF face surface of a receiver paper. Coating with the suspension of microcapsules was carried out as in Example 1. Paper treated in this manner was placed, in the absence of light, for one hour in an oven at 100° C. no appearance of discoloration; slightly granular appearance of the coated face.

The coated paper was then exposed to daylight until a slight blue discoloration appeared: this appeared after 24 hours.

EXAMPLE 4

The procedure of Example 1 was repeated under the same conditions, but using the following charges:

Solution (a)

(i) water: 577 g;
(ii) carboxymethyl cellulose, sodium salt: 4 g.

Solution (c)

(i) dye solution:
(a) partially hydrogenated terphenyl: 206.6 g;
(b) blue dye, S4G Pergascript: 10.9 g;
(ii) 1,6-diisocyanatohexane (HDI): 18.3 g;
(iii) 1,3,5-tris(6-isocyanatohexyl) isocyanurate: 27.4 g;
(iv) hexadecane: 4.3 cm$^3$.
Weight ratio HDI/trimer: 0.67/1.

Solution (b)

(i) ethylenediamine: 13.6 g;
(ii) water: 7.3 g.

A granular and pasty milky suspension was obtained, which contained approximately 32% of microcapsules.

This suspension was coated onto the CF face surface of a receiver paper. Coating with the suspension of microcapsules was carried out as in Example 1. Paper treated in this manner was placed, in the absence of light, for one hour in an oven at 100° C.: no appearance of discoloration; granular appearance of the coated face.

The coated paper was then exposed to daylight until a slight blue discoloration appeared: this appeared after 24 hours.

COMPARATIVE TEST A

Example 1 was repeated for comparison under the same conditions, but using the following charges:

Solution (a)

(i) water: 577 g;
(ii) carboxymethyl cellulose, sodium salt: 4 g.

Solution (c)

(i) dye solution:
(a) partially hydrogenated terphenyl: 206.6 g;
(b) blue dye, S4G Pergascript: 10.9 g;
(ii) 1,6-diisocyanatohexane (HDI): 45.68 g;
(iii) hexadecane: 4.3 cm$^3$.
100% Of HDI.

Solution (b)

(i) ethylenediamine: 19.6 g;
(ii) water: 16.8 g.

A markedly colored, very fluid suspension was obtained, which contained approximately 32% of microcapsules.

This suspension was coated onto the CF face surface of a receiver paper. Coating with the suspension of microcapsules was carried out as in Example 1. Paper treated in this manner was placed, in the absence of light, for one hour in an oven at 100° C.: blue discoloration; smooth appearance of the coated face.

COMPARATIVE TEST B

Example 1 was repeated for comparison under the same conditions, but using the following charges:

Solution (a)

(i) water: 400 g;
(ii) carboxymethyl cellulose, sodium salt: 6 g.

Solution (c)

(i) dye solution:
(a) partially hydrogenated terphenyl: 142.5 g;
(b) blue dye, S4G Pergascript: 7.5 g;
(ii) 1,6-diisocyanatohexane (HDI): 25.2 g;
(iii) 1,3,5-tris(6-isocyanatohexyl) isocyanurate: 6.3 g;
(iv) hexadecane: 3.0 cm$^3$.
HDI/trimer ratio: 4/1.

Solution (b)

(i) ethylenediamine: 12.15 g;
(ii) water: 4.0 g.

A colored suspension was obtained, which contained approximately 32% of microcapsules: the microencapsulation was not complete; brittle microcapsule walls.

This suspension was coated onto the CF face surface of a receiver paper. Coating with the suspension of microcapsules was carried out as in Example 1. Paper treated in this manner was placed, in the absence of light, for one hour in an oven at 100° C.: blue discoloration; smooth appearance of the coated face.

COMPARATIVE TEST C

Example 1 was repeated for comparison under the same conditions, but using the following charges:

Solution (a)

(i) water: 577 g;
(ii) carboxymethyl cellulose, sodium salt: 4 g.

Solution (c)

(i) dye solution:
(a) partially hydrogenated terphenyl: 206.6 g;
(b) blue dye, S4G Pergascript: 10.9 g;
(ii) 1,3,5-tris(6-isocyanatohexyl) isocyanurate: 45.68 g;
(iii) hexadecane: 4.3 cm$^3$.
100% of trimer.

Solution (b)

(i) ethylenediamine: 9.8 g;
(ii) water: 1.0 g.

A fluid suspension was obtained, which contained approximately 32% of microcapsules.

This suspension was coated onto the CF face surface of a receiver paper. Coating with the suspension of microcapsules was carried out as in Example 1. Paper treated in this manner was placed, in the absence of light, for one hour in an oven at 100° C.: no discoloration; granular appearance of the coated face.

The coated paper was then exposed to daylight until a slight blue discoloration appeared: this appeared after 24 hours.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a suspension of microcapsules by interfacial polyaddition, which comprises emulsifying a polyisocyanato hydrophobic liquid in an essentially aqueous medium, said polyisocyanato hydrophobic liquid comprising (i) an aliphatic diisocyanate and (ii) the isocyanurate ring trimer of an aliphatic diisocyanate, the ratio by weight of said diisocyanate (i) to said trimer (ii) ranging from 0.05/1 to 0.70/1, and then interfacially reacting a polyamine therewith.

2. A process for microencapsulating an organic material within a polyurea skin membrane by interfacial polyaddition, which comprises emulsifying a polyisocyanato nydrophobic liquid in an essentially aqueous medium, said polyisocyanato hydrophobic liquid comprising dissolved organic material to be microencapsulated, an aliphatic diisocyanate (i), and the isocyanurate ring trimer (ii) of an aliphatic diisocyanate, the ratio by weight of said diisocyanate (i) to said trimer (ii) ranging from 0.05/1 to 0.70/1, and then interfacially reacting a polyamine therewith.

3. The microencapsulation process as defined by claim 2, said aliphatic diisocyanate (i) comprising 1,6-diisocyanatohexane, 1,5-diisocyanato-2-methylpentane, 1,5-diisocyanato-3-methylpentane, 1,4-diisocyanato-2,3-dimethylbutane, 2-ethyl-1,4-diisocyanatobutane, 1,5-diisocyanatopentane, 1,4-diisocyanatobutane, 1,3-diisocyanatopropane, 1,10-diisocyanatodecane, 1,2-diisocyanatocyclohexane, 1,4-diisocyanatocyclohexane, 1,2-bis(isocyanatomethyl)cyclobutane, bis(4-isocyanatocyclohexyl)methane or 3,3,5-trimethyl-5-isocyanatomethyl-1-isocyanatocyclohexane, and said trimer (ii) comprising an isocyanurate thereof.

4. The microencapsulation process as defined by claim 2, wherein the weight ratio of aliphatic diisocyanate (i) to trimer (ii) ranges from 0.10/1 to 0.45/1.

5. The microencapsulation process as defined by claim 2, said polyisocyanato hydrophobic liquid comprising 1,6-diisocyanatohexane and 1,3,5-tris(6-isocyanatohexyl) isocyanurate.

6. The microencapsulation process as defined by claim 2, said polyamine being water soluble or dispersible, and comprising at least two primary or secondary amine groups.

7. The microencapsulation process as defined by claim 6, said polyamine comprising at least one of 1,2-ethylenediamine, 1,3-diaminopropane, 1,4-diaminobutane, 1,6-diaminohexane, hydrazine, 1,4-diaminocyclohexane, 1,4-diamino-1-methylpropane, diethylenetriamine, triethylenetetramine and bis(2-methylaminoethyl)methylamine.

8. The microencapsulation process as defined by claim 2, said hydrophobic liquid being essentially water-immiscible, and both the polyisocyanate and the organic material being soluble therein.

9. The microencapsulation process as defined by claim 8, said hydrophobic liquid comprising an aliphatic hydrocarbon, a chlorinated aliphatic hydrocarbon, an alicyclic hydrocarbon, a chlorinated alicyclic hydrocarbon, an aromatic hydrocarbon or a chlorinated aromatic hydrocarbon.

10. The microencapsulation process as defined by claim 2, said hydrophobic liquid essentially consisting of the organic material to be encapsulated.

11. The microencapsulation process as defined by claim 2, said organic material to be encapsulated comprising a colorant.

12. The microencapsulation process as defined by claim 2, said hydrophobic liquid comprising an alkylbiphenyl, an at least partially hydrogenated terphenyl or an alkylnaphthalene.

13. The microencapsulation process as defined by claim 2, said emulsifying being carried out at a temperature of from 15° C. to 30° C. and said polyamine reaction being first carried out at a temperature of from 15° C. to 30° C. and then at a temperature of from 50° to 80° C.

14. The microencapsulation process as defined by claim 2, wherein the respective amounts of polyisocyanato reactants and polyamine are such that 101% to 150% of amine groups are present in stoichiometric relation to the isocyanate groups.

15. An aqueous suspension of microcapsules comprising the product of the process as defined by claim 2.

16. The aqueous suspension as defined by claim 15, said encapsulated organic material comprising a colorant.

17. The aqueous suspension as defined by claim 16, the microcapsules of which having a mean diameter of from 3 to 20 microns.

18. The aqueous suspension as defined by claim 16, having a concentration in microcapsules of at least 25% by weight thereof.

19. The aqueous suspension as defined by claim 16, having a concentration in microcapsules of at least 30% by weight thereof.

* * * * *